United States Patent
Hsiao et al.

(10) Patent No.: US 8,449,801 B2
(45) Date of Patent: May 28, 2013

(54) COMPOSITION AND PROCESS FOR PREPARING NIR SHIELDING MASTERBATCH AND NIR SHIELDING MASTERBATCH AND APPLICATION THEREOF

(75) Inventors: Ying-Hsiu Hsiao, Tu-Chen (TW);
Sheng-Jen Lin, Taoyuan (TW);
Wei-Ming Chen, Tu-Chen (TW);
Wei-Peng Lin, Sijhih (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 206 days.

(21) Appl. No.: 12/851,583

(22) Filed: Aug. 6, 2010

(65) Prior Publication Data

US 2011/0152429 A1  Jun. 23, 2011

(30) Foreign Application Priority Data

Dec. 18, 2009 (TW) .............................. 98143744 A

(51) Int. Cl.
*B29B 9/06* (2006.01)

(52) U.S. Cl.
USPC ........... 264/142; 524/423; 524/431; 524/432; 524/606

(58) Field of Classification Search
USPC .................. 524/423, 431, 432, 606
See application file for complete search history.

(56) References Cited

U.S. PATENT DOCUMENTS

| 4,996,263 A * | 2/1991 | Pyke et al. | 525/178 |
| 6,340,531 B1 * | 1/2002 | Konda et al. | 428/516 |
| 2005/0005989 A1 * | 1/2005 | Roloff | 138/137 |
| 2006/0128862 A1 * | 6/2006 | Kanayama et al. | 524/407 |
| 2006/0258796 A1 * | 11/2006 | Boogh et al. | 524/502 |

FOREIGN PATENT DOCUMENTS

| EP | 1127926 | 2/2001 |
| EP | 1541636 | 6/2005 |
| JP | 07-057842 B * | 6/1995 |
| JP | 07189018 | 7/1995 |
| JP | 2006008972 | 1/2006 |

OTHER PUBLICATIONS

Machine translation of JP 07-057842 B, Jun. 1995.*
Machine translation of JP 07-189018, Jul. 1995.*
English language translation of abstract of JP 07189018 (published Jul. 25, 1995).
English language translation of abstract of JP 2006008972 (published Jan. 12, 2006).
Database WPI Week 200610 Thomson Scientific, London, GB; AN 2006-094211, XP002629475.
Database WPI Week 199538 Thomson Scientific, London, GB; AN 1995-290978, XP002629476.

* cited by examiner

*Primary Examiner* — Ling Choi
*Assistant Examiner* — Wenwen Cai
(74) *Attorney, Agent, or Firm* — McClure, Qualey & Rodack, LLP

(57) ABSTRACT

Disclosed herein is a method for preparing a near infrared shielding masterbatch. The method includes the steps of preparing and compounding a composition, and then pelletizing the compounded composition. The composition includes at least one metallic ionic compound powder in an amount of about 1-25 wt %, a cross-linking agent in an amount of about 0.1-5 wt %, a thermoplastic polymer in an amount of about 67-98.7 wt %, an initiator in an amount of about 0.1-1 wt %, and a dispersing agent in an amount of about 0.1-2 wt %.

13 Claims, 10 Drawing Sheets
(10 of 10 Drawing Sheet(s) Filed in Color)

COMPOSITION AND PROCESS FOR PREPARING NIR SHIELDING MASTERBATCH AND NIR SHIELDING MASTERBATCH AND APPLICATION THEREOF

RELATED APPLICATIONS

This application claims priority to Taiwan application no. 98143744, filed Dec. 18, 2009, the entirety of which is incorporated herein by reference.

BACKGROUND

1. Field of Invention

The present invention relates to a near-infrared shielding material.

2. Description of Related Art

Textiles are widely applied in our daily life, and functional textiles with additional functionality are becoming the main research and development interest of the textile industry.

Conventionally, to endow textile with an additional functionality, the surfaces of the fabrics or fibers are post-treated or -processed with active ingredient(s) so as to obtain functional textiles or fibers. Problems faced by functional textiles produced thereby include poor fastness to washing, less air permeability, and harsh hand-feel. Besides, the functional materials tend to fall-off from the functional fabrics thereby impairing the functionality endowed by the functional materials.

In contrast to the post-treatment of the fabrics, modifying the polymers so as to produce polymers with the additional functionality attracts more and more research interest. However, many challenges remain unsolved in the attempt to physically and/or chemically modify a polymeric material. For example, factors to be taken into account while physically mixing the functional material with the polymeric material include: the homogeneity of the resultant mixture and the stability of the mixture. In addition, the amount of the functional material also plays an important role, since the functional material, in an insufficient amount, may not be able to endow the final fabrics with the desired functionality, whereas the functional material, in an excess amount, may jeopardize the original properties of the polymeric material, and thereby renders the spinning and following treatment(s) inoperable.

In view of the foregoing, although polymer modification is the main research target of the textile industry, each functional material will face its own challenge in the modification process.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a composition for preparing a near-infrared shielding masterbatch, which can be used to manufacture films and/or fibers that exhibit near-infrared shielding and thermal shielding functionalities.

According to one embodiment of the present invention, the composition includes at least one metallic ionic compound powder in an amount of about 1-25 wt %, a cross-linking agent in an amount of about 0.1-5 wt %, a thermoplastic polymer in an amount of about 67-98.7 wt %, an initiator in an amount of about 0.1-1 wt %, and a dispersing agent in an amount of about 0.1-2 wt % in the composition. The metallic ionic compound powder can be at least one of: barium sulfate powder, ferrious oxide ($Fe_2O_3$) powder, copper oxide (CuO) powder, iridium dioxide ($IrO_2$) powder and zinc oxide (ZnO) powder.

In another aspect, the present invention is directed to a method for preparing a near-infrared shielding masterbatch. The method can be used, in conjunction with the composition according to the above-described aspect of the present invention, to prepare a masterbatch for use in a spinning process.

According to one embodiment of the present invention, the method comprises the steps as follows. First, a composition according to the above-described aspect/embodiment is provided. Thereafter, the composition is compounded at a compounding temperature of about 220-270° C. for about 1-20 minutes. During the compounding process, the thermoplastic polymer is melted, and the cross-linking agent would cross-link with the molten thermoplastic polymer, whereby the metallic ionic compound powder would distribute across the cross-linked thermoplastic polymer. Afterwards, the compounded composition is pelletized to obtain the near-infrared shielding masterbatch.

In still another aspect, the present invention is directed to a near-infrared shielding masterbatch that is prepared from the composition and by the method according to the above-described aspects/embodiments of the present invention. Such near-infrared shielding masterbatch contains a greater amount of the metallic ionic compound powder as comparing with the comparative example presented hereinbelow, and is suitable for use in the spinning process.

According to one embodiment of the present invention, the near-infrared shielding masterbatch comprises: a cross-linked thermoplastic polymer and at least one metallic ionic compound powder distributing across the cross-linked thermoplastic polymer. The metallic ionic compound powder is at least one of: barium sulfate powder, ferrious oxide powder, copper oxide powder, iridium dioxide powder and zinc oxide powder. The weight ratio of the cross-linked thermoplastic polymer to the metallic ionic compound powder is about 2.8:1 to about 98.8:1.

In yet another aspect, the present invention is directed to a near-infrared shielding article comprising a near-infrared shielding part manufactured from the near-infrared shielding masterbatch according to the above-described aspects/embodiments of the present invention.

In still another aspect, the present invention is directed to a method for preparing a near-infrared shielding fiber. The method can be used, in conjunction with the masterbatch according to the above-described aspect of the present invention, to prepare a near-infrared shielding fiber containing a greater amount of metallic ionic compound powder as comparing with the comparative example presented hereinbelow.

According to one embodiment of the present invention, the method comprises the steps as follows. First, a near-infrared shielding masterbatch according to the above-described aspect/embodiment is provided. Thereafter, the near-infrared shielding masterbatch is melt spinned with a spinning temperature of about 180° C. to about 300° C., a feed speed of about 5 rpm to 30 rpm, and a regulating wheel speed of about 400 m/min to about 3500 m/min.

Many of the attendant features will be more readily appreciated as the same becomes better understood by reference to the following detailed description considered in connection with the accompanying drawings.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

The present description will be better understood from the following detailed description read in light of the accompanying drawings, wherein.

DETAILED DESCRIPTION

Figure 1:
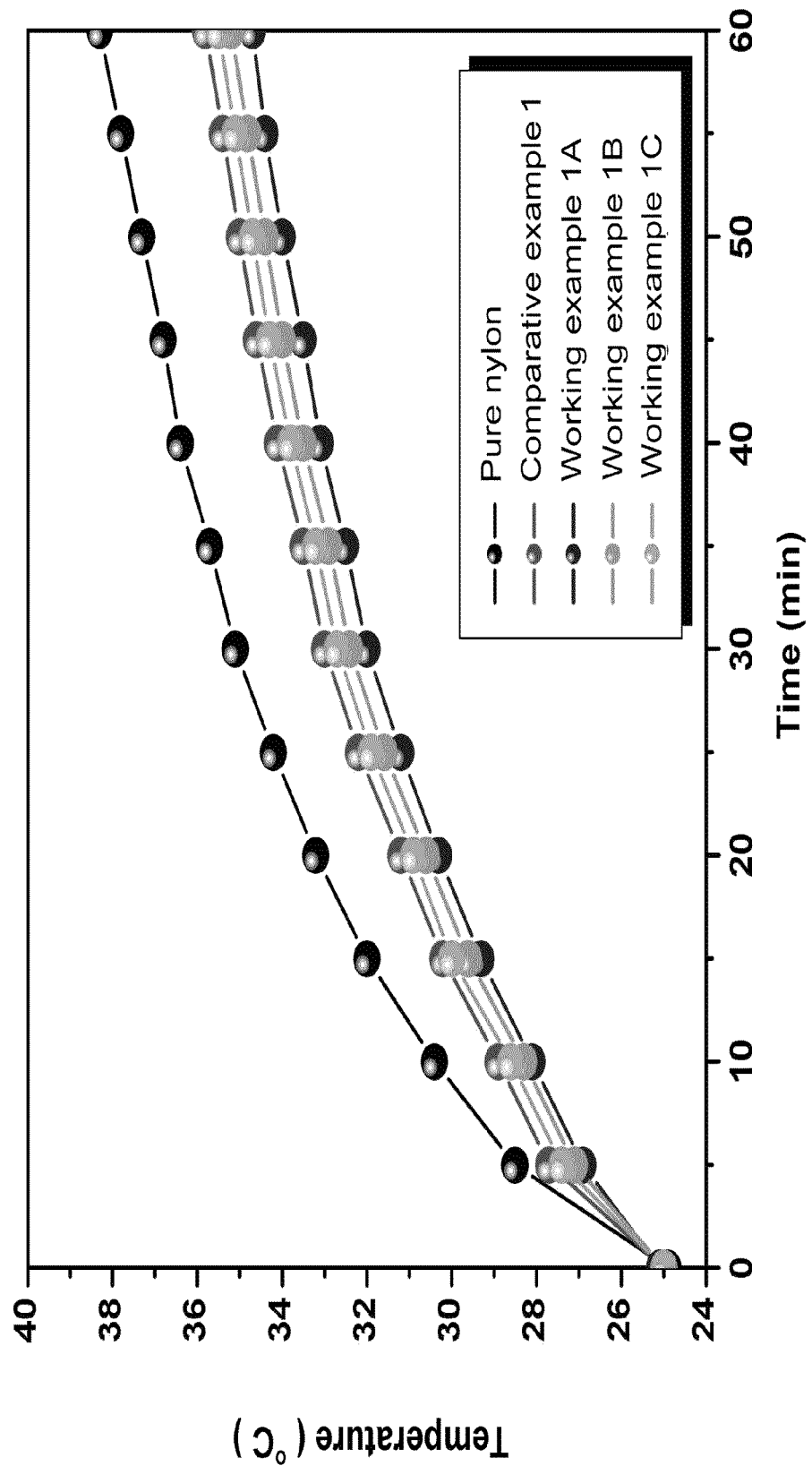
FIG. 1 is a diagram illustrating the temperature profile of a film according to one working example of the present invention.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Factors to be taken into account while manufacturing a functional masterbatch by using a modifying agent (functional material) include the efficacy of the functional material (or the resultant functional product), the compatibility between the functional material and the thermoplastic material, the effects the functional material imposing on the thermoplastic material, the processability of the resultant functional masterbatch and/or product, and the benefit-cost ratio of the functional product.

In view of the foregoing and other factors, a first aspect of the present disclosure is directed to a composition for preparing a near-infrared shielding masterbatch. Generally, the composition for preparing the near-infrared shielding masterbatch comprises: a metallic ionic compound powder, a cross-linking agent, a thermoplastic polymer, an initiator and a dispersing agent.

According to embodiments of the present invention, the metallic ionic compound powder may be at least one of: barium sulfate powder, ferrious oxide powder, copper oxide powder, iridium dioxide powder or zinc oxide powder. Such powders of metal oxides or metal salts are able to reflect and/or refract light, especially near IR. According to the principles and spirits of the present invention, the amount of the metal oxides and/or metal salts of the metallic ionic compound powder are not particularly limited and can be adjusted as desired. Specifically, each of the metal oxides and metal salts may exhibit different optical properties, and hence, the amount of any given species in the metallic ionic compound powder may be adjusted depending on the optical properties to be achieved. Moreover, the metallic ionic compound powder may comprise additional powders of metal oxides (such as titanium dioxide powder) and/or metal salts so as to modify the optical property of the resultant near-infrared shielding masterbatch.

However, the metallic ionic compound powder is an inorganic material that usually has poor compatibility with the thermoplastic polymer. As such, the metallic ionic compound powder tends to aggregate within the thermoplastic polymer, even with the addition of a dispersing agent. The issue of the poor compatibility limits not only the amount of the metallic ionic compound powder to be used, but also the near-infrared shielding efficacy that the product may exhibit.

Hence, according to this aspect of the present invention, the composition comprises a cross-linking agent, so that by cross-linking, the dispersity and uniformity of the metallic ionic compound powder within the thermoplastic polymer may be improved, and the aggregation of the metallic ionic compound powder may be alleviated. In addition, the metallic ionic compound powder distributing within the cross-linked networked structure may form a multilayered reflective mirror so as to reflect the near-infrared source.

Moreover, as can be evidenced by the working examples provided hereinbelow, the cross-linking technique may also increase the amount of the metallic ionic compound powder relative to the thermoplastic polymer. Therefore, the near-infrared shielding masterbatch and the near-infrared shielding film/fiber provided herein may exhibit the efficacies of near-infrared shielding and thermal shielding.

Further, as can be appreciated by those with ordinary skill in the art, increasing the amount of the inorganic modifying agent of the masterbatch may usually jeopardize the spinnability of the masterbatch. However, the near-infrared shielding masterbatch prepared by the method provided herein may comprise higher amount of metallic ionic compound powder (as comparing with conventional ones) and is still suitable for the spinning process.

Generally, the composition according to the present disclosure may comprises a metallic ionic compound powder present in an amount of about 1-25 wt %. For example, the weight percent of the metallic ionic compound powder is about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5 or 25%.

According to optional embodiments of the present invention, the metallic ionic compound powder may have a diameter in the micron or submicron order, thereby further improving the uniformity of the metallic ionic compound powder within the thermoplastic polymer. Generally, the diameter of the metallic ionic compound powder may be about 0.1-10 μm, for example, about 0.1, 0.2, 0.3, 0.4, 0.5, 0.6, 0.7, 0.8, 0.9, 1, 2, 3, 4, 5, 6, 7, 8, 9 or 10 μm.

According to embodiments of the present disclosure, the cross-linking agent may be a diallyl compound or a triallyl compound.

Illustrative examples of diallyl compounds include, but are not limited to, diallyl phthalate (DAP), diallyl succinate (DASu), and N,N'-diallyltartramide (DATD).

Illustrative examples of triallyl compounds include, but are not limited to, triallylamine, triacryloylhexahydro-1,3,5-triazine (TAT), triallyl trimesate (TAM), triallyl cyanurate (TAC), triallyl isocynaurate (TAIC), and triallyl-ammonium-cyanurate. For example, TAT is used in an example provided hereinafter.

According to various embodiments of the present invention, the weight percent of the cross-linking agent of the composition for preparing a near-infrared shielding masterbatch is about 0.1% to about 5%. Specifically, the weight percent of the cross-linking agent of the total composition may be about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9 or 5%.

The addition of the initiator in the composition may facilitate the cross-linking reaction. The weight percent of the cross-linking agent of the composition for preparing a near-infrared shielding masterbatch is about 0.01% to about 1%; more specifically, about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, or 1%.

The choice of the initiator often depends on the cross-linking agent to be used. Illustrative examples of initiators include, but are not limited to, potassium persulfate, azobisisobutyronitrile (AIBN), and benzyl dimethyl ketal (BDK).

The dispersing agent may assist in uniform distribution of the constituents within the composition. Generally, the dispersing agent may be $C_{15-38}$ alkanes, $C_{15-38}$ esters, $C_{15-38}$ organic acids, and mixtures thereof. In the examples presented hereinafter, the dispersing agent used is paraffin.

According to various embodiments of the present invention, the weight percent of the dispersing agent of the composition for preparing a near-infrared shielding masterbatch is about 0.1% to about 2%. Specifically, the weight percent of the dispersing agent of the total composition may be about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2%.

Any synthetic thermoplastic polymer may be used according to the embodiments of the present invention; particularly those suitable for spinning process. Examples of the thermoplastic polymer may include, but are not limited to, polyester, polyamide, and polypropylene (PP).

Specifically, illustrative examples of polyester may include polyethylene terephthalate (PET), polybutylene terephthalate (PBT), and polytrimethylene terephthalate (PTT). Polyamide is a synthetic polymer family including, but not limited to, nylon 6, nylon 6.6 and nylon 6.10.

The weight percent of the thermoplastic polymer of the total composition is about 67% to about 98.7%. Specifically, the weight percent of the thermoplastic polymer of the total composition may be about 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 98.7%.

In another aspect, the present disclosure is directed to a method for preparing a near-infrared shielding masterbatch using the composition provided in the above-mentioned aspect/embodiments.

According to one embodiment of the present disclosure, the method comprises the steps as follows. First, the composition according to above-mentioned aspect/embodiments is prepared. Then, the composition is compounded to melt the thermoplastic polymer whereby the melted thermoplastic polymer is cross-linked by the cross-linking agent, and the metallic ionic compound powder is dispersed in the cross-linked thermoplastic. Generally, the compounding step is performed for about 1-20 minutes, and a compounding temperature is about 220-270° C. Afterwards, the cross-linked thermoplastic is pelletized to obtain the near-infrared shielding masterbatch.

According to one optional embodiment, the method for preparing the composition comprises the steps as follows. First, the thermoplastic polymer and the cross-linking agent are admixed to form an admixture. Then, the initiator is added into the admixture. Afterward, the dispersing agent and the metallic ionic compound powder are added into the admixture, thereby obtaining the composition ready for compounding. The problem of the agglomeration of the metallic ionic compound powder can be further reduced by preparing the composition in accordance with this specified order.

In some embodiments, the mixing steps may be carried out in any suitable container or mixer. For example, the composition can be mixed by a 3D mixer so as to further facilitate the homogeneity of the composition. Thereafter, the composition is fed into an extruder for compounding and/or pelletizing the masterbatch. Alternatively, the mixing steps may be done in the extruder.

The compounding and pelletizing steps are carried out in the extruder. Any customary extruders and extrusion techniques for preparing masterbatches may be employed according to the embodiments of the present invention. A well-known compounding apparatus may include, but is not limited to, a twin screw extruder. During the operation of the twin screw extruder, the process parameters may be adjusted depending on the actual situation. For example, in one optional embodiment, the speed of the screw member may be adjusted to about 200-350 rpm.

In still another aspect, the present invention is directed to a near-infrared shielding masterbatch that is prepared from the composition and by the method according to the above-described aspects/embodiments of the present invention.

Such near-infrared shielding masterbatch contains a greater amount of the metallic ionic compound powder as comparing with the comparative example presented hereinbelow, and is suitable for use in the spinning press.

According to one embodiment of the present invention, the near-infrared shielding masterbatch comprises: a cross-linked thermoplastic polymer and at least one metallic ionic compound powder distributing across the cross-linked thermoplastic polymer. The metallic ionic compound powder is at least one of: barium sulfate powder, ferrous oxide powder, copper oxide powder, iridium dioxide powder and zinc oxide powder. The weight ratio of the cross-linked thermoplastic polymer to the metallic ionic compound powder is about 2.8:1 to about 98.8:1. As such, the resultant shielding masterbatch comprises thermoplastic polymer cross-linked by the cross-linking agent and metallic ionic compound powder distributed across the cross-linked thermoplastic polymer.

According to various embodiment of the present invention, in the near-infrared shielding masterbatch, the weight ratio of the cross-linked thermoplastic polymer to the metallic ionic compound powder and is about 2.8:1 to about 98.8:1.

For example, if the weight percent of the metallic ionic compound powder based on the total composition is about 1%, the sum of the weight percents of the thermoplastic polymer and the cross-linking agent is about 98.8%. In this case, the weight ratio of the cross-linked thermoplastic polymer to the metallic ionic compound powder is about 98.8:1. Similarly, if the weight percent of the metallic ionic compound powder based on the total composition is about 25%, the sum of the weight percents of the thermoplastic polymer and the cross-linking agent is about 72% at maximum. In this case, the weight ratio of the cross-linked thermoplastic polymer to the metallic ionic compound powder is about 72:25 (that is, about 2.8:1).

As described hereinabove, the near-infrared shielding masterbatch is prepared from the composition according to the aspect/embodiments of the present invention. Hence, the constituents making up the composition and weight ratios thereof are disclosed in the above-described embodiments. Accordingly, for the sake of brevity, a description of the composition for preparing the near-infrared shielding masterbatch is not repeated.

In another aspect, the present invention is directed to a near-infrared shielding article, which comprises a near-infrared shielding part that is prepared from the near-infrared shielding masterbatch according to the above-mentioned aspect/embodiments of the present invention.

In various optional embodiments, the near-infrared shielding part can be manufactured in a form of a fiber, a filament, a yarn, a textile, a film, a sheet, or a chip.

According to one optional embodiment, the near-infrared shielding article can be manufactured into a core-sheath fiber. Generally, a core-sheath fiber comprises a core fiber and a sheath fiber, wherein the core fiber can be concentrically or eccentrically arranged. For example, the near infrared shielding masterbatch can be used to prepare the core fiber, and thereby, the resultant core-sheath fiber can exhibit the near-infrared shielding functionality. Test results show that such core-sheath fiber has satisfactory fiber strength and washing fastness.

In optional embodiments, the core fiber and the sheath fiber may have a core/sheath ratio of about 1:1 to about 3:1. As used herein, the core/sheath ratio is the weight ratio of the core fiber to the sheath fiber. For example, the core/sheath ratio of the core-sheath fiber provided herein may be about 1:1, 1.5:1, 2:1, 2.5:1 or 3:1.

According to another optional embodiment, the near-infrared shielding article can be manufactured into a sea-island fiber. Generally, a sea-island fiber comprises a sea component fiber and a plurality of island component fibers embedded in the sea component fiber. In one example, the near infrared shielding masterbatch can be used to prepare the island component fibers.

In yet another aspect, the present invention is directed to a method for preparing a near-infrared shielding fiber.

According to one embodiment of the present invention, the method comprises the steps as follows. First, the near-infrared shielding masterbatch according to the above-mentioned aspect/embodiments is prepared. Then, the masterbatch undergoes a melt spinning process to produce a near-infrared shielding fiber. Generally, the melt spinning may be carried out at the following conditions: a melt spinning temperature of about 180° C. to 300° C.; masterbatch feed speed of about 5 rpm to about 30 rpm; and godet wheel rotate speed of about 400 m/min to about 3500 m/min.

For example, the melt spinning temperature can be about 180, 190, 200, 210, 220, 230, 240, 250, 260, 270, 280, 290 or 300° C. According to one optional embodiment of the present invention, the melt spinning temperature is about 240° C. to 275° C.

The masterbatch feed speed can be about 5, 6, 7, 8, 9, 10, 11, 12, 13, 14, 15, 16, 17, 18, 19, 20, 21, 22, 23, 24, 25, 26, 27, 28, 29 or 30 rpm. According to one optional embodiment of the present invention, the masterbatch feed speed is about 15 rpm to 30 rpm.

Some working examples according to embodiments of the present invention are provided hereinafter, wherein the constituents making up the composition and weight ratios thereof were adjusted to obtain various masterbatches. The masterbatches were then manufactured into film(s) and/or fiber(s), and the near-infrared transmittance thereof and the temperature profiles of an enclosed space shielded thereby were analyzed.

In the working examples present hereinbelow, the sample was analyzed by a near-infrared spectrometer (Model: Jasco V-570 UV/Vis/NIR Spectrophotometer) to investigate the light transmittance of the sample over the wavelength range of about 900-2500 nm.

The method for measuring the temperature profile of an enclosed space shield by the sample being irradiated by near-infrared includes the steps as follows. A 10 cm×10 cm sample (ex., the film or fabric) was put in an enclosed container, and the initial temperature of this container was measured to obtain the reference temperature. Then, the sample was irradiated by a near infrared lamp (wavelength range: 800-2500 nm), and the temperature within the enclosed container was measured and recorded every five minutes. As used herein, the term "temperature rise" of the container at a given time is defined as the difference between the temperature measured at that time and the reference temperature.

Experiment 1

In Experiment 1, various near-infrared shielding masterbatches were prepared in accordance with the method described hereinabove where the amount of the cross-linking agent was adjusted in each near-infrared shielding masterbatch. The masterbatch was then made into the form of a film having a thickness of about 0.01 cm, and the temperature profile of the container shielded thereby was recorded.

In this example, the metallic ionic compound powder comprised about 5 parts by weight of a mixture ferric oxide ($Fe_2O_3$) and cupric oxide (CuO), about 1 part by weight of iridium dioxide powder, about 2 parts by weight of barium sulfate powder, and about 2 parts by weight of zinc oxide powder. In this experiment, TAIC was used as the cross-linking agent and the weight ratio thereof is summarized in Table 1, about 0.1 wt % of BDK was used as the initiator, about 0.5 wt % of paraffin was used as the dispersing agent, and the thermoplastic polymer used was nylon 6.

The weight ratios of the metallic ionic compound powder and the cross-linking agent of each working and comparative example in Experiment 1 are summarized in Table 1, and the temperature rise of each example against time is illustrated in the curve diagram of FIG. 1.

TABLE 1

| | Metallic ionic compound powder (wt %) | Cross-linking agent (wt %) | Temperature rise after 1 hr (° C.) |
|---|---|---|---|
| Working example 1A | 5 | 1 | 9.7 |
| Working example 1B | 5 | 2 | 10.2 |
| Comparative example 1 | 5 | 0 | 10.8 |
| Pure nylon | 0 | 0 | 13.3 |

Reference is made to Table 1 and FIG. 1. As shown in Table 1, after being irradiated by the near-infrared lamp for one hour, the temperature rise in the container shielded by the pure nylon film was about 13.3° C. (38.3° C.−25° C.=13.3° C.). In comparison, in the comparative example 1 (containing about 5 wt % of the metal compound powder but no cross-linking agent), the temperature rise after one hour was about 10.8° C., which was 2.5° C. less than that of the pure nylon film. Further, the data showed that the temperature rise can be further reduced in the working examples. Take working example 1A as an example, the temperature rise after one hour was about 9.7° C., which was 3.6° C. less than that of the pure nylon film and 1.1° C. less than that of the comparative example 1. The data present in Table 1 and FIG. 1 show that the films prepared from the near infrared shielding masterbatch according to the present invention exhibit thermal shielding functionality.

Experiment 2

In Experiments, the constituents making up the composition and weight ratios thereof are substantially similar to that of Experiment 1, except that the weight ratio of the metallic ionic compound powder was varied and the weight ratio of the cross-linking agent was fixed at about 1 wt %. The resultant near-infrared shielding masterbatch was then made into the form of a film having a thickness of about 0.01 cm. Thereafter, the near-infrared transmittance of the film was analyzed, and the temperature profile of the container shielded thereby was recorded.

The weight ratios of the metallic ionic compound powder, the temperature rise and near-infrared transmittance of each working and comparative example in Experiment 2 are summarized in Table 2. The temperature profile of each container shielded by the films is illustrated by the curve diagram of FIG. 2. The near-infrared spectrogram (over the range of 900-2500 nm) of some working examples of this experiment is present in FIG. 3.

TABLE 2

|  | Metallic ionic compound powder (wt %) | Temperature rise after 1 hr (° C.) | NIR transmittance (%) |
|---|---|---|---|
| Working example 2A | 1 | 11.3 | 15-40 |
| Working example 2B | 3 | 10.6 | 14-37 |
| Working example 2C | 5 | 9.7 | 3-7 |
| Working example 2D | 7 | 9.3 | 2-5 |
| Working example 2E | 10 | 8.7 | 2-7 |
| Working example 2F | 15 | 8 | 1-5 |
| Working example 2G | 20 | 7.5 | 1-5 |
| Working example 2H | 25 | 7.2 | 1-4 |
| Comparative example 2* | 15 | — | — |
| Pure nylon | 0 | 13.3 | 55-70 |

*Without cross-linking agent.

Figure 2:
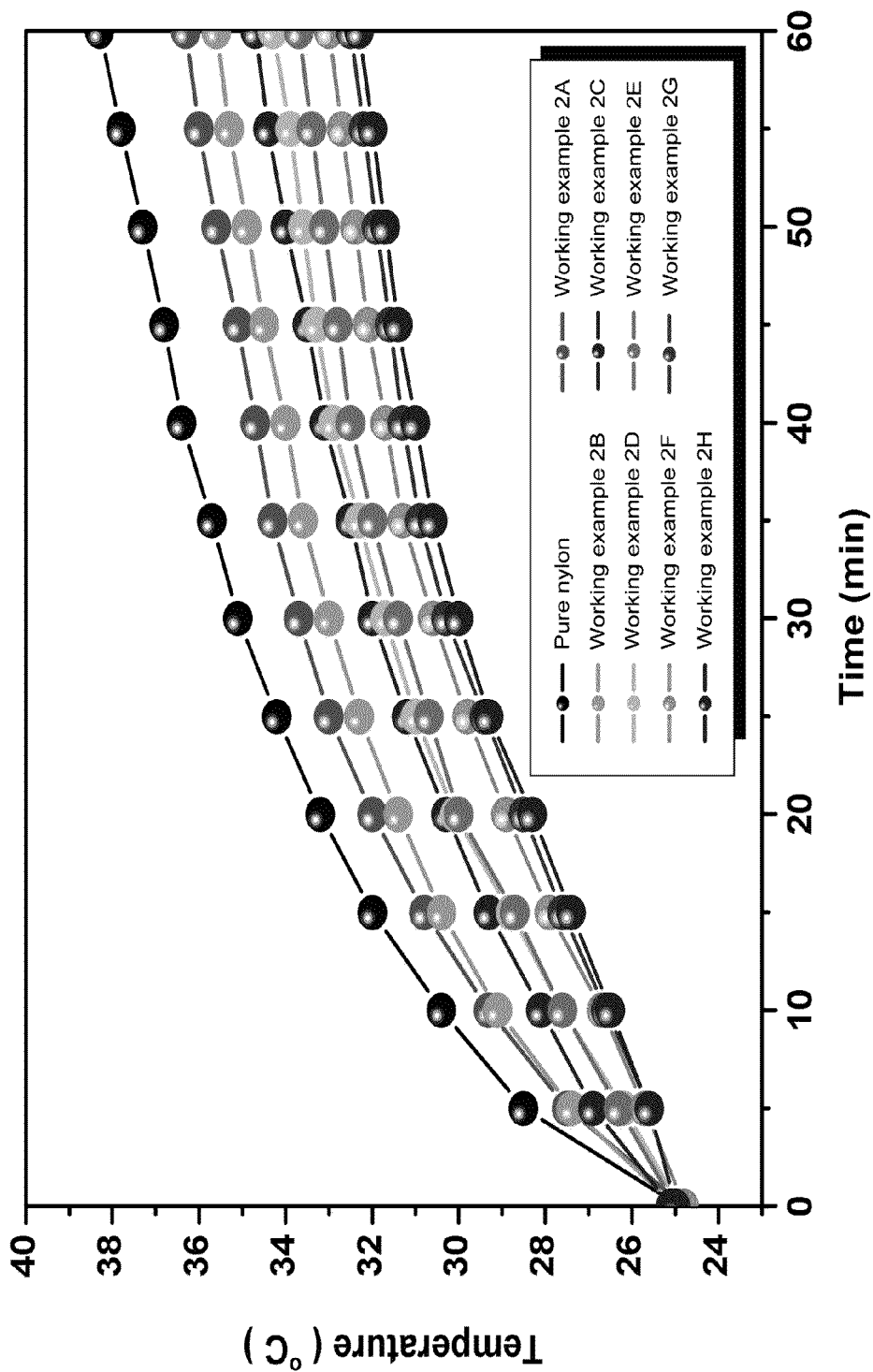
FIG. 2 is a diagram illustrating the temperature profile of a film according to another working example of the present invention.

As shown in Table 2 and FIG. 2, the thermal shielding efficacy of the near-infrared shielding film increases as the amount of the metallic ionic compound powder increases. According to the present invention, the thermal shielding efficacy of a sample is evidenced by less temperature rise of the container shielded by the sample. Tale working example 2F as an example, after being irradiated by the near-infrared lamp for one hour, the temperature within the container shielded thereby was elevated by only about 8° C. In comparison; the temperature rise of the container shielded by the pure nylon film under the same condition was about 13.3° C., which is about 5.3° C. higher than the working example 2F. Also, the difference of the temperature rise after one hour between the working example 2H and the pure nylon film is about 6.0° C.

Figure 3:
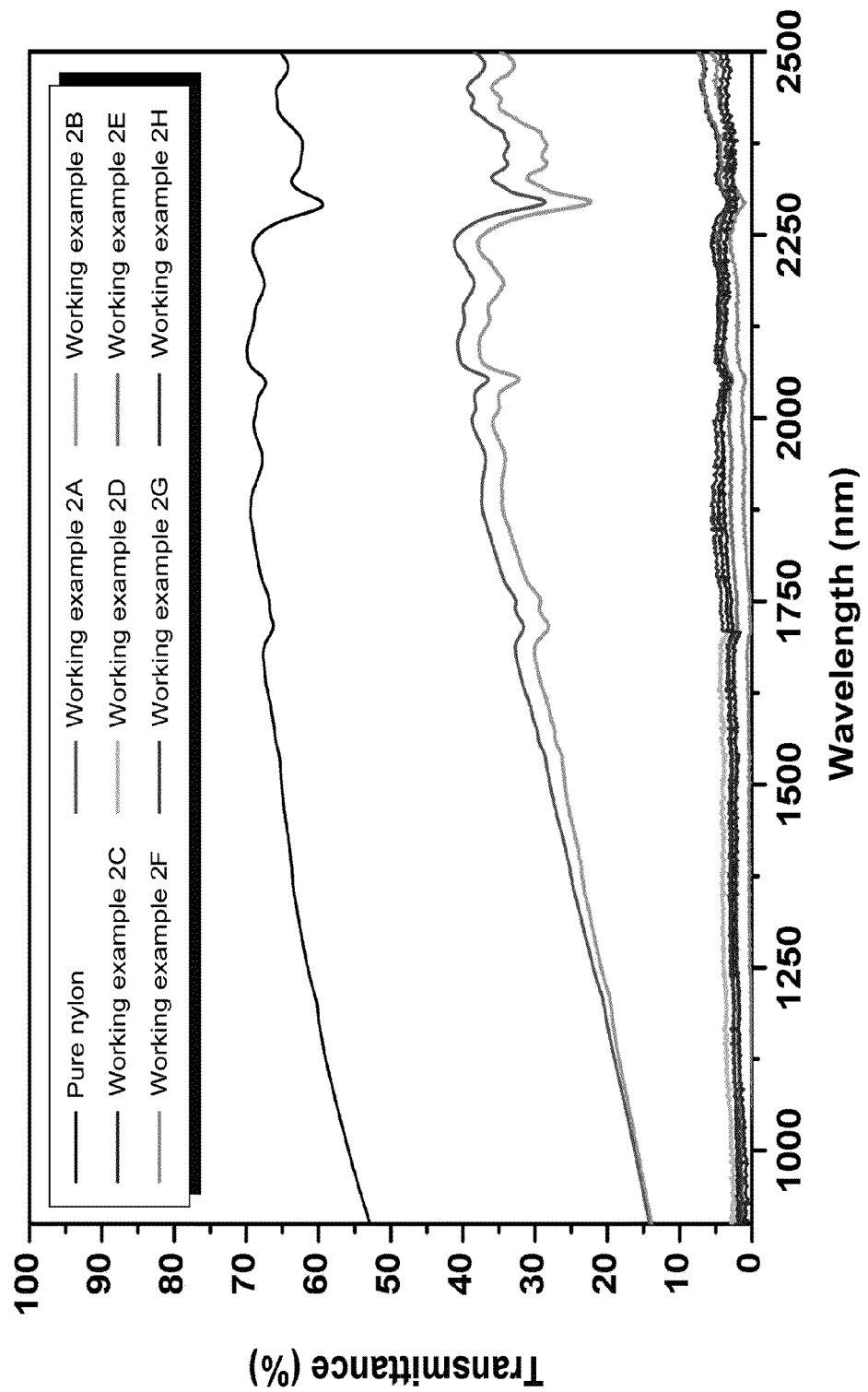
FIG. 3 is a near-infrared spectrogram of a film according to one working example of the present invention.

Moreover, as can be seen from Table 2 and FIG. 3, the near-infrared transmittance of the sample decreases as the amount of the metallic ionic compound powder increases.

Together, these test results establish that the near-infrared shielding film prepared from the near-infrared shielding masterbatch provided herein exhibits both the near-infrared shielding efficacy and the thermal shielding efficacy. Without being bound to any theory, it is believed that the near-infrared shielding film or fabric provided herein may reflect the irradiation from the heat source, and hence, the temperature within the container shielded thereby is lower than that of the container shield by the pure nylon film.

As would be appreciated by those having ordinary skill in the art, the stability of the spinning pressure plays an important role in the viability of the spinning process. In the case when the inorganic powder agglomerates or distribute unevenly within the masterbatch, the spinning pressure of such masterbatch may increase abruptly which may cause damage to the spinning apparatus. Therefore, simulation analysis of the spinning pressure was carried out to investigate the spinnability of the masterbatch of working examples 2A to 2H and the comparative example 2 provided herein.

The results of the simulation analysis of the spinning pressure reveal that after about 10 minutes of simulation, the spinning pressure of the masterbatch of the comparative example 2 was maintained at about 40 bars. However, after about 20 minutes, the spinning pressure continued to rise, and after about 35 minutes, the spinning pressure exceeded 60 bars. As will occur to those with ordinary skills in the art, the variations of the spinning pressure in connection with comparative example 2 preclude the use of such masterbatch in a commercialized spinning process.

In contrast, after about 5 minutes of simulation, the spinning pressure of the masterbatch of the working example 2H achieved about 40 bars, and the pressure was relatively stable (as compared with that of the comparative example 2) during the entire evaluation period.

Conventionally, the strong hydrogen bonds between the nylon polymer chains may result in the agglomeration of the powder within the nylon polymer. However, the free radical compounding technique provided herein may facilitate the uniform distribution of the inorganic powder within the nylon polymer. Without being bound to any theory, it is believed that after the compounding step, the nylon material may have an interpenetrating network (IPN) with less hydrogen bonds, and thereby, the particles of the inorganic oxide powder may be evenly distributed therein.

In view of the foregoing, the composition and preparation method provided herein not only addresses the agglomeration of the inorganic powder within the nylon polymer, but also improves the spinnability of the resultant masterbatch.

Experiment 3

In Experiment 3, the masterbatch of the working example 2C was further made into the form of a filament and core-sheath fiber having a core/sheath ratio of about 1:1, 2:1 and 3:1, respectively. Illustrated in FIGS. 4A, 4B and 4C are optical micrographs of the cross-sections of the above-mentioned core-sheath fiber.

Generally, a core-sheath fiber has a core fiber and a sheath fiber. In one example, the sheath fiber may be made of a pure nylon chip and the core fiber may be made of the masterbatch provided herein. Conventionally, a masterbatch consisting of an inorganic powder admixed with a nylon material is not suitable for use as the core fiber of a core-sheath fiber, because the sheath fiber made of the nylon chip may not substantially cover such core fiber.

Figure 4A:
FIGS. 4A-4C are optical micrographs of core-sheath fibers according to working examples of the present invention.
Figure 4B:
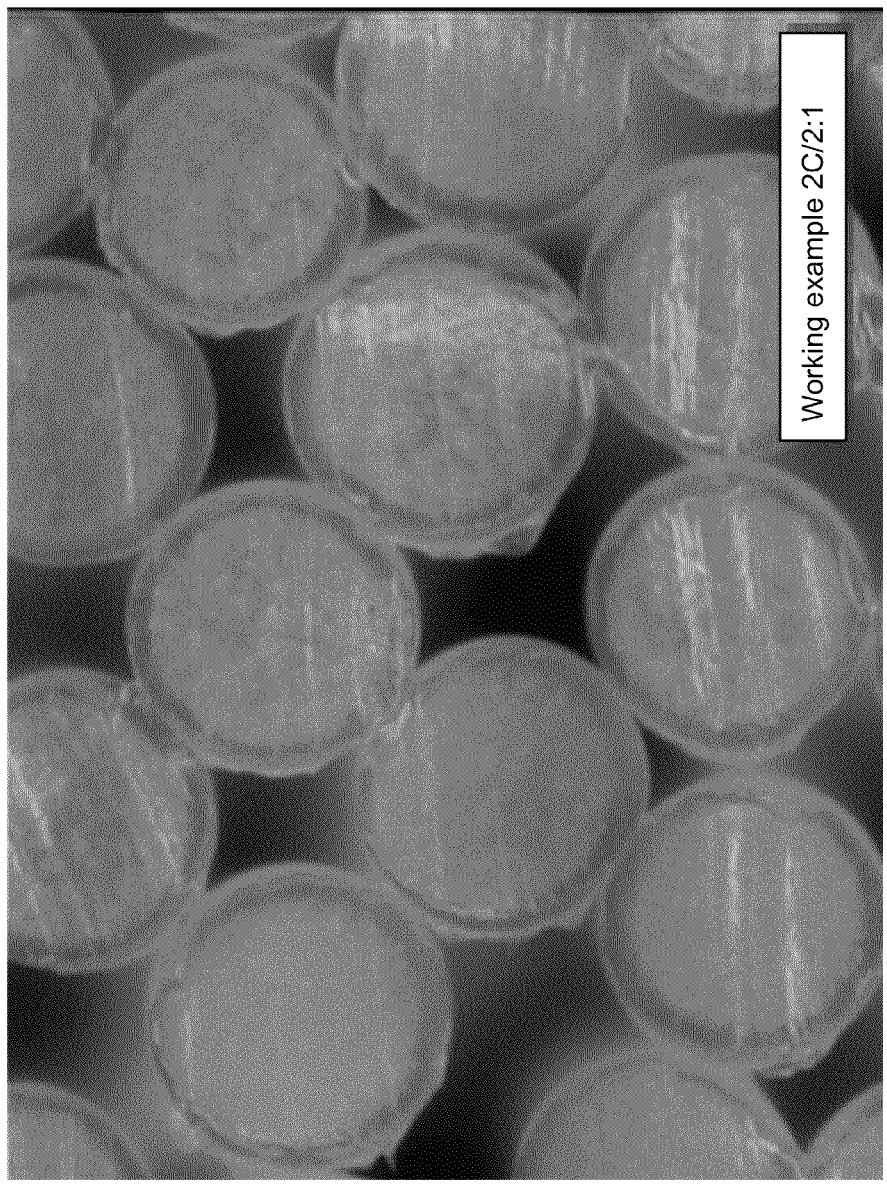
Figure 4C:
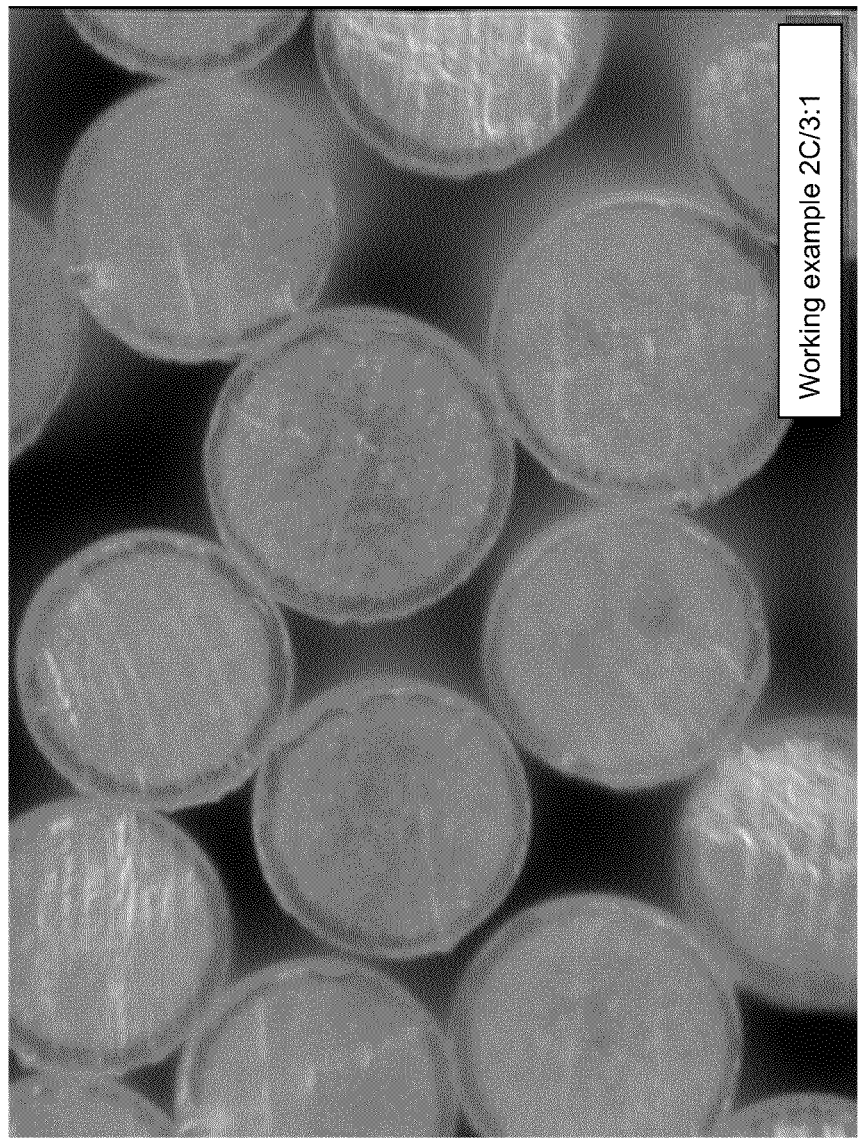

However, as is evidenced by the photos of FIGS. 4A to 4C, the sheath fiber according to the present working example may substantially cover the whole outer surface of the core fiber.

The parameters of the spinning process of the Experiment 3 were: a spinning temperature of about 240-275° C.; a spinning feed speed of about 15-30 rpm; and a godet extension of about 2.5-2.7 folds. The resultant fiber was then knitted into a fabric. The thermal shielding efficacy of the knitted fabric was measured in accordance with the method for measuring the thermal profile set forth hereinabove, and the results thereof is illustrated in FIG. 5.

Figure 5:
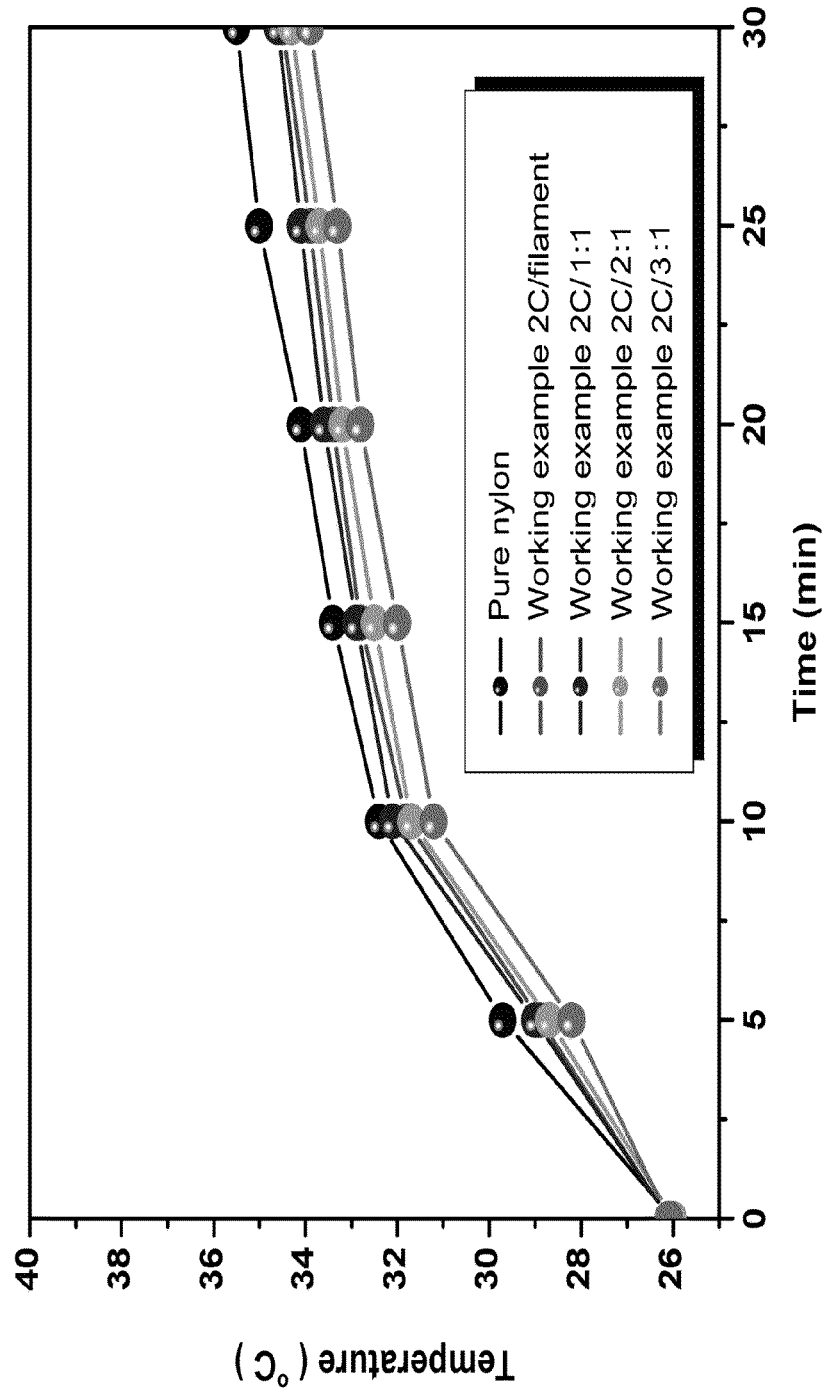
FIG. 5 is a diagram illustrating the temperature profile of a fabric according to one working example of the present invention.

As can be seen in FIG. 5, the knitted fabrics according the embodiments provided herein exhibited better thermal shielding efficacies than the fabric made of pure nylon. Besides, the thermal shielding efficacies of the fabrics made of core-sheath fibers were more satisfactory than the fabric made of the filament. Moreover, among the fabrics made of the core-sheath fibers, the one having a core/sheath ratio of about 3:1 exhibited the best thermal shielding efficacy. Without being bound to any theory, it is speculated that during the spinning process, the particles of the powder residing near the surface of the filament may be wore-off and the filament fiber may be damaged, thereby jeopardizing the thermal shielding efficacy thereof.

In view of the foregoing results, the near-infrared shielding masterbatches of working example 2C, 2F, 2G and 2H were further made into the form of a core-sheath conjugate fiber having a core/sheath ratio of about 3:1, and the resultant fibers were further knitted. The temperature profiles of the knitted fabrics are illustrated in FIG. 6, and the near-infrared spectrograms (over the range of 900-2500 nm) thereof are present in FIG. 7.

Figure 6:
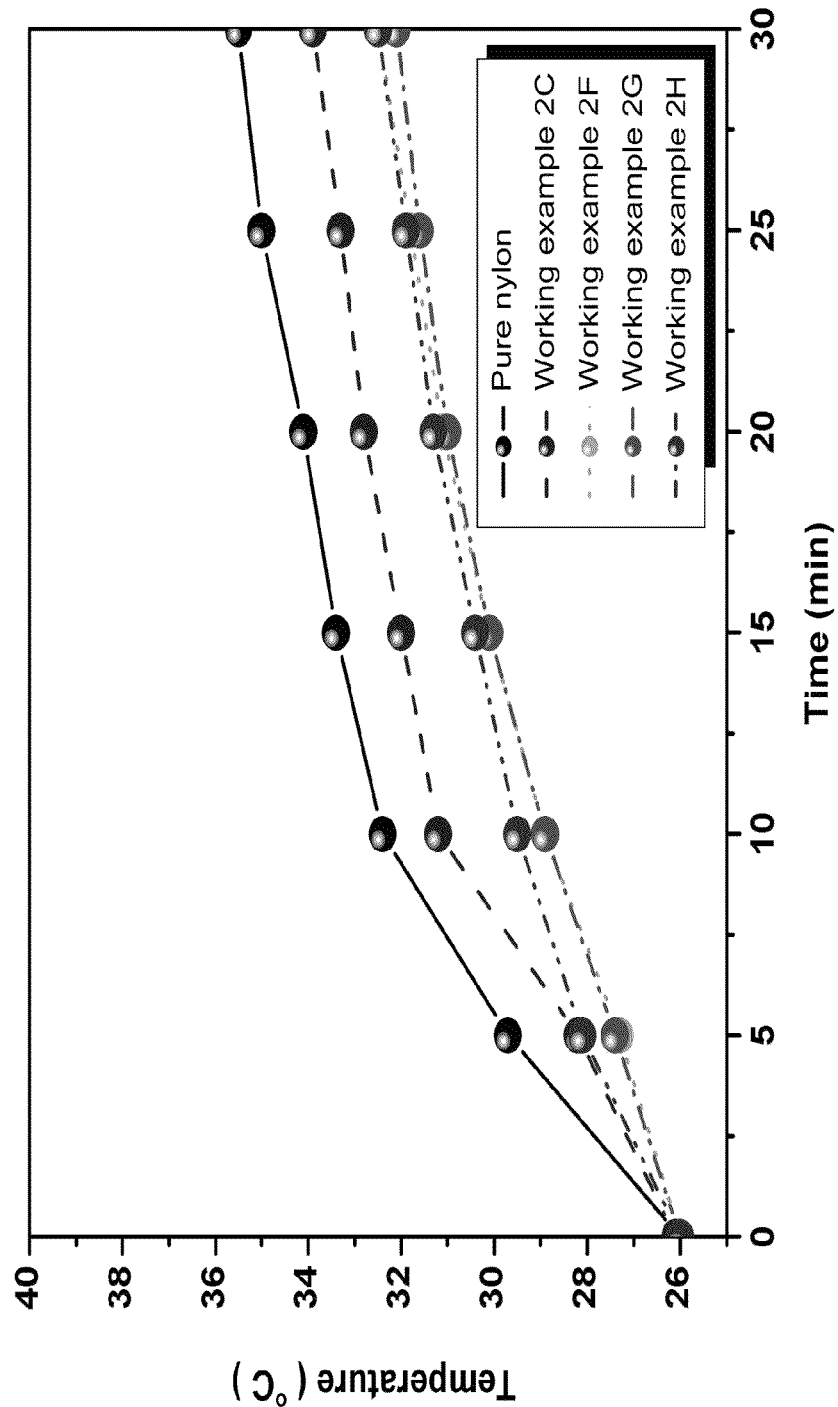
FIG. 6 is a diagram illustrating the temperature profile of a fabric according to another working example of the present invention.
Figure 7:
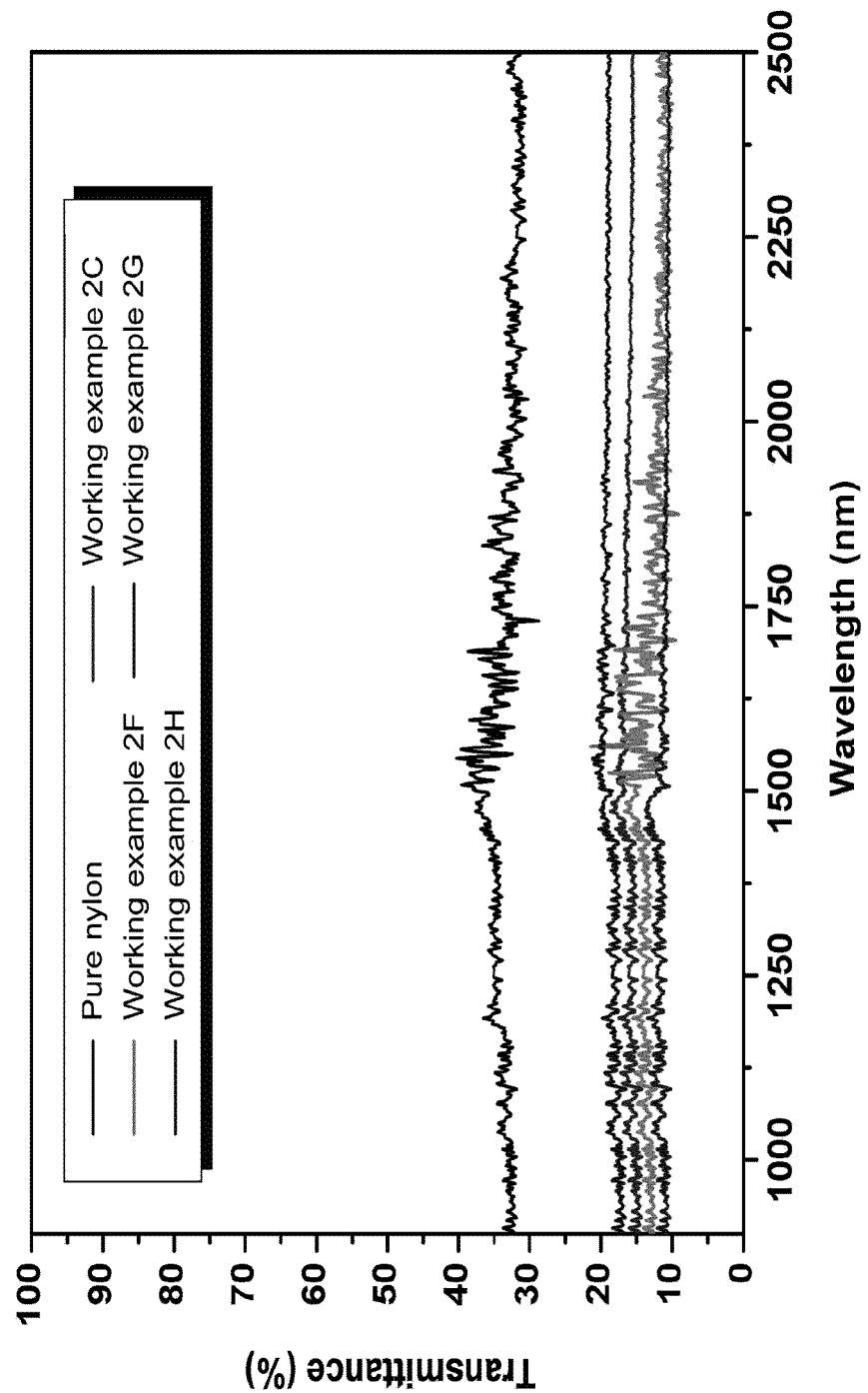
FIG. 7 is a near-infrared spectrogram of a fabric according to one working example of the present invention.

FIG. 6 shows that the fabrics of the working examples provided herein exhibited better thermal shielding efficacies as compared with the fabric made of pure nylon. Also, as can be seen in FIG. 7, the fabrics of the working examples provided herein exhibited better near-infrared shielding efficacies as compared with the fabric made of pure nylon.

The filament and core-sheath fibers of the working examples were also plain-woven respectively to obtain a cloth. The color fastness to water of the cloth was determined in accordance with the protocol set forth in AATCC 61-2008 standard. The test results show that the average discoloration level of such fabrics is about level 4.5, which means that these fabrics have an adequate color fastness to water.

Moreover, the masterbatch of working example 2H was made into core-sheath fibers having a core/sheath ratio of about 1:1, 2:1 and 3:1, respectively. The denier, tenacity, and elongation at break of the fibers were determined under test conditions in accordance with ASTM D1907-89 option 1, ASTM 1425-89 and ASTM D2256-90 option A1 standards, respectively. Test results are summarized in Table 3.

TABLE 3

|  | Core/sheath ratio 1:1 | Core/sheath ratio 2:1 | Core/sheath ratio 3:1 |
| --- | --- | --- | --- |
| Denier/Filament (d/f) | 71.1/24 | 69.7/24 | 71.1/24 |
| Tenacity (gf/den) | 3.16 | 3.03 | 3.0 |
| Elongation (%) | 37 | 35 | 34 |

Conventionally, for a fiber made of a nylon material containing about 20 wt % of an inorganic material, the tenacity of such fiber is usually less than 2 gf/den. However, although the amount of the metallic ionic compound powder in the masterbatch of working example 2H was about 25 wt %, the tenacity of the fiber prepared therefrom was about 3 gf/den.

Experiment 4

In Experiment 4, thermal shielding efficacy of a near-infrared shielding polyester film was evaluated. In this regard, the composition for preparing the masterbatch of working example 3 is quite similar to that of working example 1, except that polyester was used to substitute the nylon 6. Other constituents making up the composition of working example 3 included: about 5 wt % of a metallic ionic compound powder (the formulation thereof was the same as that of the Experiment 1), about 1 wt % of the cross-linking agent (TAIC), about 0.1 wt % of the initiator (BDK) and about 0.5 wt % of the dispersing agent (paraffin). Comparative example 3, on the other hand, was made of pure polyester chip. The masterbatch was then made into the form of a film having a thickness of about 0.01 cm. The thermal profile of an enclosed container shielded by the film was measured and recorded for one hour, and the results thereof are illustrated as the curve diagram of FIG. 8.

Figure 8:
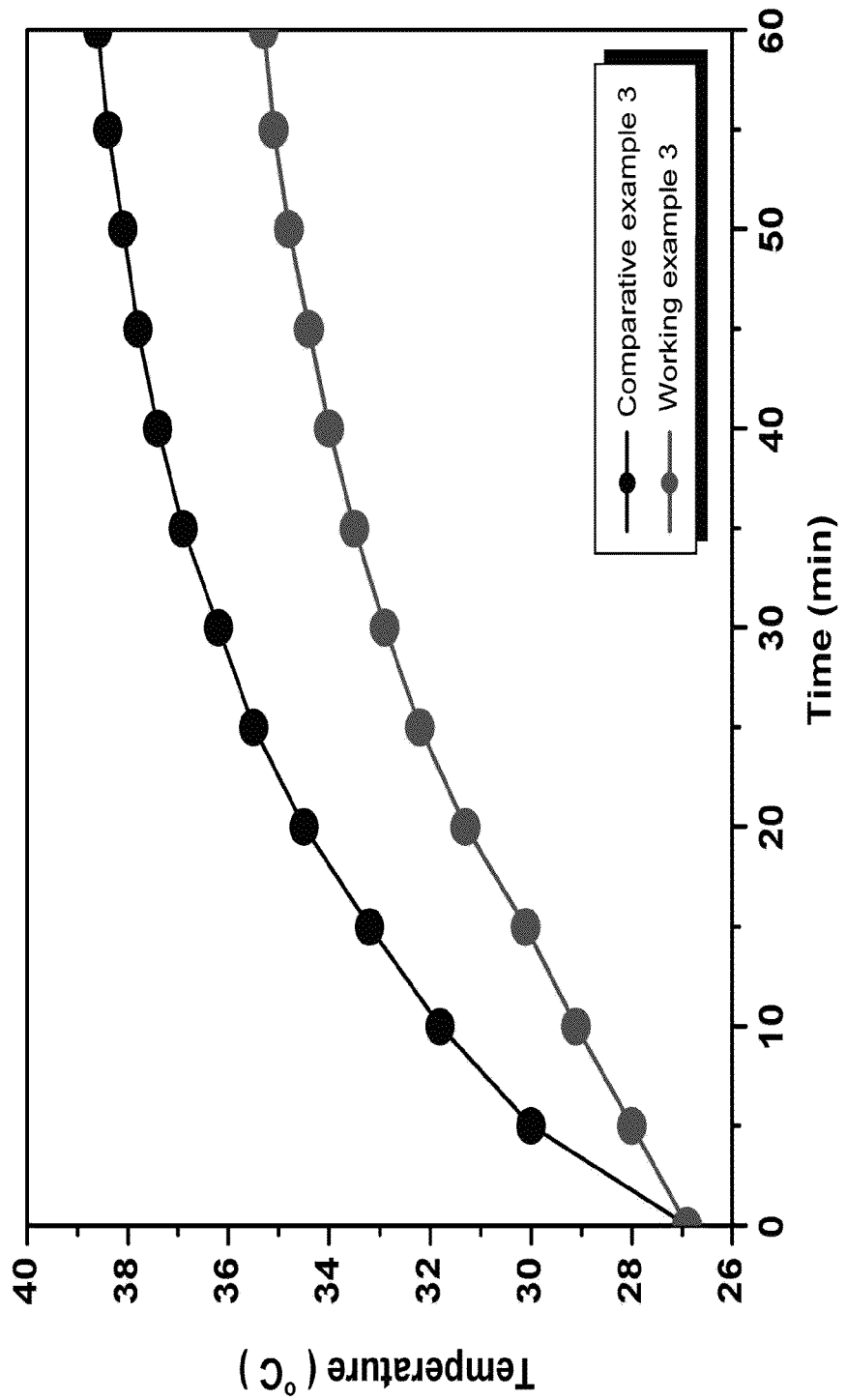
FIG. 8 is a diagram illustrating the temperature profile of a fabric according to another working example of the present invention.

As can be seen in FIG. 8, after one hour of near-infrared irradiation, the temperature rise of the container shielded by the pure polyester film was about 11.6° C.; in contrast, the temperature rise of that of working example was about 8.3° C.

Simulation analysis of the spinning pressure of the masterbatch of working example 3 was also carried out, and the simulation result showed that this masterbatch may achieve a stable spinning pressure during the simulation period. Hence, the masterbatch of working example 3 is suitable for use in the spinning process.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method for preparing a near-infrared shielding masterbatch, comprising the steps of:
   providing a composition comprising:
   at least one metallic ionic compound powder in an amount of about 1 wt % to about 25 wt %, wherein the metallic ionic compound powder is selected from a group consisting of barium sulfate powder, ferrous oxide powder, copper oxide powder, iridium dioxide powder, zinc oxide powder and combinations thereof;
   a cross-linking agent in an amount of about 0.1 wt % to about 2 wt %;
   a thermoplastic polymer in an amount of about 67 wt % to about 98.7 wt %;
   an cross-linking initiator in an amount of about 0.1 wt % to about 1 wt %; and
   a dispersing agent in an amount of about 0.1 wt % to about 2 wt %;
   compounding the composition at a compounding temperature of about 220-270° C. for about 1 minute to about 20 minutes; and
   pelletizing the compounded composition to obtain the near-infrared shielding masterbatch.

2. The method of claim 1, wherein the metallic ionic compound powder has a diameter of about 0.1 μm to about 10 μm.

3. The method of claim 1, wherein the metallic ionic compound powder has a diameter of about 1 μm.

4. The method of claim 1, wherein the cross-linking agent is a diallyl compound or a triallyl compound.

5. The method of claim 4, wherein the diallyl compound is diallyl phthalate, diallyl succinate, or N,N'-diallyltartramide.

6. The method of claim 4, wherein triallyl compound is triacryloylhexahydro-1,3,5-triazine, triallylamine, triallyl trimesate, triallyl cyanurate, triallyl isocyanurate, or triallylammoniumcyanurate.

7. The method of claim 1, wherein the initiator is potassium persulfate, azobisisobutyronitrile, or benzyl dimethyl ketal.

8. The method of claim 1, wherein the dispersing agent is selected from a group consisting of $C_{15-38}$ alkanes, $C_{15-38}$ esters, $C_{15-38}$ organic acids, and combinations thereof.

9. The method of claim 1, wherein the thermoplastic polymer is polyester, polyamide or polypropylene.

10. The method of claim 9, wherein the polyester is polyethylene terephthalate, polybutylene terephthalate, or polytrimethylene terephthalate.

11. The method of claim 9, wherein the polyamide is nylon 6, nylon 6.6, or nylon 6.10.

12. The method of claim 1, wherein the steps of providing the composition comprises:
   mixing the thermoplastic polymer and the cross-linking agent to form a first mixture;
   adding the initiator into the first mixture to form a second mixture; and
   adding the dispersing agent and the metallic ionic compound powder into the second mixture to form the composition.

13. The method of claim 1, further comprising mixing the composition with a 3D mixer before the compounding step.

* * * * *